(12) United States Patent
Heitmann (10) Patent No.: US 11,122,739 B2
(45) Date of Patent: Sep. 21, 2021

(54) FORAGE HARVESTER AND METHOD FOR OPERATING A FORAGE HARVESTER

(71) Applicant: CLAAS Selbstfahrende Erntemaschinen GmbH, Harsewinkel (DE)

(72) Inventor: Christoph Heitmann, Warendorf (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 224 days.

(21) Appl. No.: 16/275,712

(22) Filed: Feb. 14, 2019

(65) Prior Publication Data

US 2019/0261561 A1 Aug. 29, 2019

(30) Foreign Application Priority Data

Feb. 26, 2018 (DE) .......................... 102018104287.6

(51) Int. Cl.
*A01D 41/127* (2006.01)
*G05B 13/02* (2006.01)

(52) U.S. Cl.
CPC ........... *A01D 41/127* (2013.01); *G05B 13/02* (2013.01)

(58) Field of Classification Search
CPC .... A01D 41/127; A01B 79/005; A01B 79/02; G06Q 50/02; G06T 2207/30188; G06K 9/00657
See application file for complete search history.

(56) References Cited

U.S. PATENT DOCUMENTS

| | | | | |
|---|---|---|---|---|
| 2003/0066277 A1* | 4/2003 | Behnke | ............... | A01D 41/127 56/10.2 R |
| 2006/0241837 A1* | 10/2006 | Jarrett | .................... | A01B 63/00 701/50 |
| 2010/0217474 A1* | 8/2010 | Baumgarten | ........ | A01D 41/127 701/31.4 |

(Continued)

FOREIGN PATENT DOCUMENTS

| | | |
|---|---|---|
| DE | 10241788 A1 | 4/2004 |
| EP | 1380204 A1 | 1/2004 |

(Continued)

OTHER PUBLICATIONS

European Search Report for European Patent Application No. 182116095-1205 dated Aug. 6, 2019.

*Primary Examiner* — Rami Khatib
*Assistant Examiner* — Gabriel J Lambert
(74) *Attorney, Agent, or Firm* — Lempia Summerfield Katz LLC (57) ABSTRACT

An agricultural work machine for performing an agricultural work process is disclosed. The agricultural work machine includes working units and a driver assistance system for controlling the working units to achieve one or more quality criteria. The driver assistance system may set parameters to control the working units in order to satisfy the criteria. Further, the driver assistance system includes a graphical user interface through which an operator may change the setting of one of the quality criteria. Responsive to the change, the driver assistance system may determine the expected effects on other quality criteria. In addition, the driver assistance system may visually highlight the expected effects on the graphical user interface.

20 Claims, 6 Drawing Sheets

(56) References Cited

U.S. PATENT DOCUMENTS

2012/0004812 A1\* 1/2012 Baumgarten ........ A01D 41/127
  701/50
2014/0019018 A1\* 1/2014 Baumgarten ........ G05B 13/021
  701/50
2016/0052525 A1\* 2/2016 Tuncer .............. B60W 50/0098
  701/50

FOREIGN PATENT DOCUMENTS

| EP | 2220926 A1 | 8/2010 |
| EP | 2401904 A2 | 1/2012 |
| EP | 102011005317 A1 | 9/2012 |
| EP | 2987396 A1 | 2/2016 |

\* cited by examiner

FORAGE HARVESTER AND METHOD FOR OPERATING A FORAGE HARVESTER

CROSS REFERENCE TO RELATED APPLICATION

This application claims priority under 35 U.S.C. § 119 to German Patent Application No. DE 102018104287.6, filed Feb. 26, 2018, the entire disclosure of which is hereby incorporated herein by reference.

TECHNICAL FIELD

The technical field relates to an agricultural work machine. More specifically, the technical field relates to a forage harvester with a plurality of working units.

BACKGROUND

DE 102 41 788 A1, incorporated by reference herein in its entirety, discloses a forage harvester with a chopping device that has cutting blades arranged such that they are distributed over the perimeter of a rotatably driven cutterhead. The length of the chopped material is determined by the rotational speed of the cutterhead and can be adapted by a control device depending on the moisture of the harvested material. The moisture of the harvested material is determined by sensors.

DE 10 2011 005 317 B4 discloses a forage harvester with a chopping device, wherein the state of the sharpness of the cutting edges of the cutting blades is determined by means of a device. Moreover, the spacing between the cutting edge and shear bar of the cutterhead is adjusted by means of the device. To determine the sharpness of the cutting edge, the cutting blades pass through a field of an inductive sensor whose sensor values are transmitted to an evaluation unit. Predefined threshold values for the sharpness are saved in the evaluation unit, and if the threshold values are undershot, sharpening of the cutting edges of the cutting blades is automatically triggered, or an operator is informed of the need for sharpening. To accomplish this, the evaluation unit is connected to a computer of the forage harvester.

EP 1 380 204 B1, incorporated by reference herein, discloses a forage harvester with a post-acceleration device that serves to accelerate a flow of material comprising chopped harvested material that is supplied along a delivery shaft of the post-acceleration device. The post-acceleration device is sectionally surrounded by a housing within which the post-acceleration device is relatively movable by means of an axial shifting mechanism in order to be able to change the distance between the delivery shaft and the post-acceleration device. In this arrangement, the spacing may be changed depending on the moisture, density or speed of the harvested material. The moisture, density or speed is determined by a sensor whose signals are transmitted to an evaluation and computing unit. Resetting is accomplished by an actuator which is controlled by the evaluation in computing unit.

DESCRIPTION OF THE FIGURES

The present application is further described in the detailed description which follows, in reference to the noted plurality of drawings by way of non-limiting examples of exemplary implementation, in which like reference numerals represent similar parts throughout the several views of the drawings, and wherein.

DETAILED DESCRIPTION

The methods, devices, systems, and other features discussed below may be embodied in a number of different forms. Not all of the depicted components may be required, however, and some implementations may include additional, different, or fewer components from those expressly described in this disclosure. Variations in the arrangement and type of the components may be made without departing from the spirit or scope of the claims as set forth herein. Further, variations in the processes described, including the addition, deletion, or rearranging and order of logical operations, may be made without departing from the spirit or scope of the claims as set forth herein.

A forage harvester may include a plurality of working units, sensors monitoring operation of the working units, at least one adjustable harvested material handling means, at least one actuator for adjusting and/or actuating the at least one harvested material handling means, and a control unit for controlling the actuator, such as controlling the actuator depending on an operating or harvesting process parameter detected by the sensors. Typically, these control units, such as control circuits, operated as closed systems and work autonomously. That is, any reciprocal effects from adjustments made to a working unit on the functioning and quality of other working units are not considered. This lack of consideration may negatively affect the performance of the forage harvester.

In contrast, in one implementation, a forage harvester and a method for operating such a forage harvester are disclosed with a control unit that considers one or more reciprocal effects from adjustment(s) made to a working unit on the functioning and quality of other working units, thereby improving greater efficiency results during the operation of the forage harvester, such as operation in harvesting mode.

In one implementation, a forage harvester is disclosed that includes: a plurality of working units for performing a process (such as a harvested material processing process); a driver assistance system that includes a memory configured to save data and a computing device configured to process the saved data stored in the memory and configured to generate output for display on a graphical user interface, wherein the working units have: at least one adjustable harvested material handling means; at least one actuator configured to adjust and/or actuate the at least one harvested material handling means; and a control unit configured to control the actuator, whereby the respective working unit is designed as an adjusting machine and is integrated in the higher-level driver assistance system in the control hierarchy, wherein the functioning of one, some, or all adjusting machines may be improved or optimized based on control of the driver assistance system or depending on operations of at least one of the other adjusting machines. Thus, the integration of the adjusting machine into the higher-level control hierarchy of driver assistance system may improve the functioning of one, some, or all of the adjusting machines by the driver assistance system or depending on at least one other adjusting machine. This may increase the overall efficiency of the functioning and mode of operation of the forage harvester, e.g., in regard to the interaction of all working units and each individual working unit per se.

In another implementation, a method for operating a forage harvester is disclosed, with the method including: performing a harvested material processing process by a plurality of working units; using a driver assistance system, which comprises a memory for saving data, and a computing device for processing the saved data in the memory and for generating output for output on a graphical user interface, wherein the working units have at least one adjustable harvested material handling means, one actuator through which the at least one harvested material handling means is adjusted, and a control unit for controlling the actuator, wherein the respective working unit is designed as an adjusting machine and is integrated in the higher-level driver assistance system in the control hierarchy, wherein the driver assistance system improves or optimizes the functioning of one, some or all of the adjusting machines, such as the driver assistance system improving or optimizing the functioning of one or some of the adjusting machines or wherein the function of the adjusting machines is improved or optimized depending on the operation of one or more of the remainder adjusting machines.

In this regard, the driver assistance system may have sets of rules, which may be saved in a memory, such as the memory of the driver assistance system or in a memory unit of the respective control units that are assigned to the respective adjusting machines, wherein the set of rules assigned to the respective adjusting machine may produce an improvement or an optimization of the mode of operation of the respective working unit independent of the mode of operation of the other working units.

In particular, the driver assistance system may have selectable, working-unit-specific strategies saved in the memory for optimizing the mode of operation of the individual working units. Individual selectability of working-unit-specific strategies may improve or optimize the mode of operation. Accordingly, the working-unit-specific strategies may, for example, have "efficiency", "cost", "performance" and "work quality" as target settings. The listed working-unit-specific strategies are merely for illustration. Other working-unit-specific strategies are contemplated. These target settings of working-unit-specific strategies may vary corresponding to each working unit to be improved or optimized since target settings or strategies may be provided that are not identical for all working units.

In this regard, the selectable working-unit-specific strategies may each be directed toward a target for adjusting or optimizing at least one harvesting process parameter by specifying at least one operating parameter of at least one of the working units. In one implementation, harvesting process parameters may comprise working results that can be determined qualitatively and/or quantitatively of individual working units up to the working result of the forage harvester in its entirety. Example harvesting process parameters may include any one, any combination, or all of the compactability of harvested material, area output, ensilability of harvested material, power consumption, etc. that may be influenced by one or more operating parameters of at least one of the working units.

In one implementation, the driver assistance system may be activated in either one, or both, of the following ways: by an operator, or by the detection of a critical forage harvester mode of operation. In this regard, it is possible for the operator to actively perform an optimization of the one or more working units. conversely, a critical mode of operation detected in the context of automated process monitoring can quickly lead to an independent activation of the driver assistance system in order to counteract the critical mode of operation. Thus, in the context of this implementation, the operator may then only be requested to perform an optimization responsive to the system detecting the actual worsening of a work result.

In one implementation, the driver assistance system controls the adjusting machines of the forage harvester as a supervisor so that improvement or optimization of an overall work process of the forage harvester can occur.

For this, the optimization of the overall work process may comprise at least the following steps:

a) analyze the mode of operation of the forage harvester and identify a critical mode of operation;

b) process at least one set of rules saved in the computing device to overcome the critical mode of operation by proposing optimized operating parameters of one or more working units, taking into account interactions between the working units;

c) visualize the effect of interactions;

d) adjust, independently or by an operator, the operating parameters generated in step b) of one of the plurality of working units, and operate the forage harvester with the optimized operating parameters; and e) evaluate and review the mode of operation of the forage harvester after adjusting the optimized operating parameters for the at least one working unit.

This sequence allows for improvement or optimization to be chronologically transparent. The operator may thus remain informed about the achieved effects and may be notified of the actions that have been and/or are yet to be performed. In this context, the visualization of the effect of possible interactions between the individual working units assists the operator since it can give the operator active knowledge of how the changes to individual operating parameters can affect the overall process. The actual selection of the work-unit-specific strategy that underlies each optimization process may thus be taken into account.

In particular, at least some of the working units can be assigned a sensor system that is configured to detect signals to determine operating parameters as well as working-unit-specific parameters. The driver assistance system is configured to receive and evaluate the signals of the respective sensor system. "Operating parameters" may comprise information that can be set by the actuators of the respective working unit, such as the rotational speed, distance, etc. The term "work-unit-specific parameter" describes the respective work result of a working unit, such as the throughput, cutting length, and/or harvested material cracking. In one implementation, the driver assistance system is the device that centrally receives and evaluates signals from the respective sensor system, so that the driver assistance system functions as a supervisor.

Moreover, the sensor systems may be configured to provide, as input signals, the signals detected by the respective sensor system for determining the working-unit-specific parameters to the adjusting machine that corresponds therewith. The current working-unit-specific parameters are accordingly available for the respective adjusting machines independent of the driver assistance system in order to be optimizable independent of the other adjusting machines.

Moreover, the driver assistance system may be configured to provide or route output signals from the respective adjusting machine to one, some, or all of the remaining other adjusting machines in the forage harvester as additional control input signals. Optimization of the adjusting machines across one, some, or all working units may be accomplished since each of the adjusting machines is notified about changes to the operating parameters of one, some or all of the other adjusting machines, which may reduce or minimize the influence of interactions on the respective optimization process.

In one implementation, the driver assistance system may be networked with additional assistance systems that serve to control or regulate any one, any combination or all of the drive device, chassis, steering system, transfer system and/or lane guidance system. An assistance system for the drive device may be configured to automatically set a driving speed of the forage harvester when the operator specifies a drive device load depending on the harvested material throughput and the load. The drive device assistance system may also be operated by specifying a functional strategy, such as cruise control, constant throughput or engine load. A chassis assistance system may, for example, be a tire pressure regulation system that is configured to automatically adapt the tire pressure for street driving or field driving. As an assistance system for the steering and/or lane guidance system, active intervention in the steering of the forage harvester may be provided in order to guide the forage harvester along parallel lanes. In so doing, additional correction signals may be used in addition to positioning signals in order to increase the precision of lane guidance.

One or more working units may be used with the forage harvester, such as at least one attachment, one feed device, one chopping device, one grinding device, one post-acceleration device and one ejection device.

Alternatively, or in addition, a post-processing device and/or a silage additive metering device can be provided as additional working units.

In one implementation, an attachment machine and a feed machine may be provided as adjusting machines. In particular, the attachment machine and feed machine may improve or optimize the harvesting and throughput of harvested material. The adjustments for reaching a good flow of material in the attachment and the feed device and the adjustments for avoiding excess lengths may oppose or be contrary to each other.

In particular, the attachment machine and the feed machine can be functionally combined in a supply machine. Adjustments for optimizing the flow of material and chopping quality may necessitate the coordinated adaptation of operating parameters of the attachment and feed device in order to avoid excessive lengths, combining the two adjusting machines, the feed machine attachment and feed machine, into a supply machine is more advantageous. For this, the supply machine may be provided with corresponding signals from a sensor system that is configured to determine excessive lengths in the chopped harvested material in order for the supply machine to perform an optimization.

Moreover, example adjusting machines may include a chopping machine and/or a cutting edge sharpening machine. The opposing strategies of "work quality" and "performance" of the chopping device can be depicted by the chopping machine in that the harvesting process parameters of "compactability" and "area output" of the chopping device are optimized by specifying at least one operating parameter of one of the harvested material handling means according to the corresponding set of rules.

The cutting edge sharpening machine has a major influence on the harvesting process parameters of "compactability" and "area output" of the chopping device since the sharpness of the cutting blades of the chopping device influence both the chopping quality as well as the power requirement. Decreasing sharpness prevents the harvesting process parameters of "compactability" and "area output" of the chopping device from being optimizable in the envisioned manner within the context of the given strategy. Correspondingly, in its function as a supervisor, the driver assistance system may intervene in order to achieve an optimization based on these interactions.

Moreover, adjusting machines may include a post-processing machine and/or a silage additive machine. The post-processing machine controls or regulates the mode of operation of the post-processing device. Using the post-processing machine, the opposing strategies of "work quality" and "performance" of the post-processing machine can be depicted in that the harvesting process parameters of "cracking" and "area output" of the post-processing device are optimized by specifying at least one operating parameter of one of the harvested material handling means of the post-processing device according to the corresponding set of rules. Optimized operation of the post-processing device is moreover very relevant with regard to fuel consumption.

The silage additive machine controls or regulates the mode of operation of the silage additive metering device taking into consideration the opposing strategies of "work quality" and "cost". Using one of the sensory systems, the contents of the chopped material can be detected in order to determine the amount of silage additive needed for successful ensilability. Moreover, information on the respective throughput can be provided to the silage additive machine in order to be able to react to or compensate any fluctuations in throughput.

Moreover, adjusting machines may include an ejection machine and/or an auxiliary unit optimization machine. The ejection machine controls or regulates the mode of operation of the post-acceleration device and the ejection device taking into consideration the opposing strategies of "efficiency" and "performance". Using one of the sensor systems that is assigned to the ejection device, the flow speed and the flow behavior or the flow of harvested material can be determined and monitored. The settings for a good flow of material on the one hand and low power consumption on the other hand can be determined by the set of rules.

The ancillary unit optimization machine may be assigned the task of performing further optimizations with respect to "work quality", "performance" and "efficiency" in addition to the central adjusting machines of the respective working units. The set of rules of the ancillary unit optimization machine is based on the same prerequisites as the others sets of rules for the adjusting machines. For example, the auxiliary unit optimization machine may be supplied by the sensor system with corresponding throughput-specific signals that determine the throughput of harvested material in order for the auxiliary unit optimization machine to perform a throughput-dependent adjustment of the drum floor of the chopping device, which can reduce the power consumption by the chopping device. It is also contemplated to reset the distance of a shaft wall to the post-acceleration device when harvesting grass in order to achieve a faster discharge speed.

In one implementation, the driver assistance system may comprise a dialog module that is for dialog-guided operation of the driver assistance system by an operator. The dialog module may serve to simplify the adjustment and optimization of the working units for the operator of the forage harvester in that the operator uses the dialog module to forward to the driver assistance system a problem that can result from an identified critical mode of operation. The driver assistance system may, in particular, assist in solving the problem by stepwise instructions to the operator. In so doing, the driver assistance system may work iteratively and in interactive dialog with the operator.

In this context, the dialog-guided operation between the driver assistance system and operator may be in natural language. Using the natural-language dialog, the transparency and understanding of optimization as performed by the driver assistance system is improved, and its handling is simultaneously simplified.

In particular, a dialog between the driver assistance system and the operator may comprise one, some, or all of the following steps:
 a) activate the dialog module,
 b) edit an intended purpose,
 c) start an "optimization" module that requests or requires the operator to select a strategy,
 d) activate a dialog-guided optimization of at least one operating parameter of a working unit depending on the selected strategy accounting for an influence by working-unit-specific parameters of other working units.

A dialog between the operator and the driver assistance system may therefore occur that is basically always structured the same, whereby working with the driver assistance system is simplified due to a high degree recognition, independent of which intended purpose is selected by the operator.

In one implementation, the driver assistance system may be connectable to a mobile data processing device for performing bidirectional communication, wherein the mobile data processing device has a graphical user interface and is configured to execute at least the functions of the driver assistance system of the forage harvester for visualization and for remote control. The mobile data processing device may be configured to provide at least the same information, dialogs and manipulation options that are possible through the driver assistance system. Moreover, the data visualization and dialogs may be performed in nearly the same manner as is the case with the driver assistance system. The operator accordingly sees basically the same user interface and operating structure. With the mobile data processing device, there are expanded options for use, for example observation of the work process by another person, in particular outside of the forage harvester. Likewise, the driver assistance system can be controlled remotely by means of the mobile data processing device. For example, a strategic change may be initiated by another process participant of a process chain when the other process participant feels that an adaptation of a harvesting process parameter is warranted to achieve the goal of the selected strategy.

In this context, the forage harvester may comprise a communication unit that is equipped with at least one first interface that is connectable to a bus system of the forage harvester, and at least one second interface for processing and preparing signals from the bus system, and for transmitting to the mobile data processing device.

In particular, the mobile data processing device may have a memory unit in which retrievable audiovisual sequences are saved. For example, the mobile data processing device may support servicing, retrofitting or repair measures to be performed that are done manually whereby the mobile data processing device may provide additional information in the form of texts, pictures and video sequences that are also available outside of the forage harvester by using the mobile data processing device.

In one implementation, the mobile data processing device is operated independently of the operating state of the forage harvester. Accordingly, the operator may also be provided with information on the forage harvester as well as tasks to be performed even when the forage harvester is shut down to perform manual jobs. This is particularly beneficial when additional optimization options suggested by the driver assistance system or installation and modification tasks are to be performed. For this, the operator may be provided with corresponding instructions independent from the driver assistance system.

Figure 1:
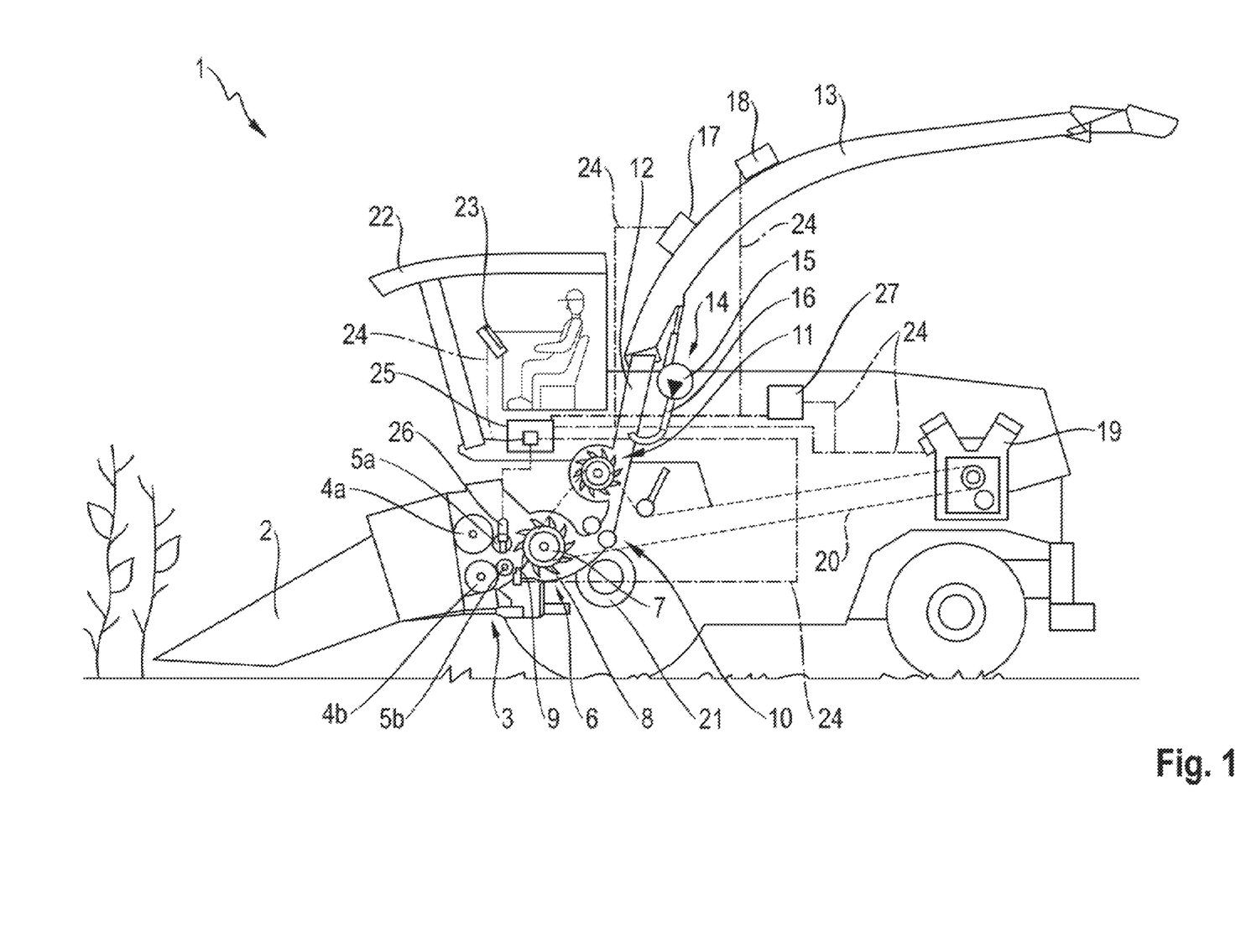
FIG. 1 shows a schematic representation of a forage harvester.

Referring to the figures, FIG. 1 shows a schematic representation of a self-propelled forage harvester 1 in a side view. The forage harvester 1 has an attachment 2 for harvesting, such as harvested material with stalks. The attachment 2 may be designed, inter alia, as a so-called corn header or a corn picker. To harvest grass, the attachment 2 may be designed as a mower.

The harvested material gathered by the attachment 2 is supplied to a feed device 3. The feed device 3 comprises at least one first pair of rollers 4a, 4b and a second pair of rollers 5a, 5b that are arranged on a frame or a housing. The at least two roller pairs 4a, 4b and 5a, 5b serve to pull in and prepress the harvested material. The roller pairs 4a, 4b and 5a, 5b form a harvested material handling means that is adjustable. Accordingly for example, the pressure as well as the drive speed of the roller pairs 4a, 4b and 5a, 5b may change.

A chopping device 6 is downstream from the feed device 3. The chopping device 6 comprises a rotatably driven cutterhead 7 equipped with cutting blades 8. To comminute the harvested material supplied in the form of a compacted harvested material mat, the cutting blades 8 that rotate with the cutterhead 7 interact with a fixedly arranged shear bar 9 of the chopping device 6. The distance of the shear bar 9 relative to the envelope circle of the cutting blades 8 may be adjusted and readjusted. A very small distance contributes to a reduction in the force required for cutting and a constant cutting quality. A grinding device (not shown) that is assigned to the chopping device 6 serves to sharpen the cutting blades 8 as needed in order to counteract worsening chopping quality from blunt cutting blades and a higher energy requirement when driving the chopping device.

The comminuted harvested material leaving the chopping device 6 can be supplied to an optionally provided post-processing device 10. The post-processing device 10, also termed a conditioning apparatus or corn cracker, serves to crack corn grains in order to increase the usability or energy yield when used as feed or in a biogas plant. Such post-processing devices 10 comprise a roller pair, wherein the rollers are driven at different rotational speeds. The rotational speed ratio of the roller pair of the post-processing device 10 is variable. The grain cracking is, in particular, determined by a gap width between the two rollers of the post-processing device 10. The smaller the gap width, the greater the grain cracking. The gap width is adjustable. The post-processing device 10 is removable from the flow path of material of the forage harvester 1 as needed.

From the chopping device 6 or the optional post-processing device 10, the comminuted harvested material passes to a post-acceleration device 11 that transfers the harvested material through a delivery shaft 12 and a subsequent ejection device 13 designed as a discharge spout to a transport vehicle (not shown) driving adjacent to the forage harvester 1. In the region of the post-acceleration device 11, a silage additive metering device 14 is arranged that introduces a liquid into the delivery shaft 12 by means of a feed pump 15 with a changing delivery volume. For this, an injector 16 is provided that terminates in the delivery shaft 12 and ends in the direction of flow of the harvested material, whereby the liquid is applied in a finely sprayed form to the harvested material flowing by. Arranged on the ejection device 13 is at least one sensor 17 that is configured to at least determine the moisture content of the comminuted harvested material, or respectively the dry matter. The at least one sensor 17 can be designed as a near infrared (NIR) sensor that is also configured to detect contents such as the raw ash or raw protein content of the harvested material flowing by. The assignment of one or more additional sensors 18 for determining the chaff length, the flow speed of the harvested material and/or the mass flow of the harvested material flowing by to the ejection device 13 can be provided.

To drive the forage harvester 1, a drive device 19 designed as an internal combustion engine is provided that drives the chopping device 6, the post-processing device 10 and the post-acceleration device 11 using a belt drive 20. The attachment 2 and the feed device 3 may be driven by another drivetrain that is mechanically coupled to the chopping device 6, or may be operated hydrostatically independently of the chopping device 6. Moreover, a hydrostatic drive 21 may be provided, through which the driving speed of the forage harvester 1 can be regulated.

The forage harvester 1 has a cabin 22 in which an input/output device 23 is provided that is available to an operator of the forage harvester 1 for example to enable setting and resetting operating parameters, and to inform the operator of current operating and/or harvesting conditions. The input/output device 23 is connected by a bus system 24 to a driver assistance system 25 of the forage harvester 1. The bus system 24 moreover connects the sensors 17, 18 to the ejection device 13, as well as a sensor 26 of the feed device 3 and other sensors or sensor systems 34 and actuators 32 (not shown in FIG. 1) for monitoring and adjusting and/or actuating the attachment 2, feed device 3, chopping device 6, grinding device, post-processing device 10, post-acceleration device 11, silage additive metering device 14, ejection device 13 and the drive 21, which hereinafter will be termed working units 30 for short, to the driver assistance system 25. The sensors 17, 18 and 26 will hereinafter be generally designated by the term sensor system 34.

Each of these working units 30 comprises at least one adjustable harvested material handling means 31 through which the harvested material is manipulated by the forage harvester 1 from being picked up by the attachment 2 until dispensed by the ejection device 13 when passing through the harvested material handling process. For example, in the case of the feed device 3, the two roller pairs 4a, 4b and 5a, 5b form the harvested material handling means 31. In the case of the chopping device 6, the cutterhead 7 with the cutting blades 8 arrange thereupon, the shear bar 9 as well as a drum floor form a harvested material handling means 31. The at least one actuator 32 of the respective working unit 30 serves to adjust, reset and/or actuate a harvested material handling means 31 of a working unit 30 corresponding to the existing harvesting conditions. The sensors or sensor systems 34 monitor operation and working-unit-specific parameters of the working units 30 and the harvested material that they handle.

Moreover, the depiction in FIG. 1 shows a communication unit 27 that is connected to the bus system 24. The communication unit 27 is configured to receive the data transmitted by means of the bus system 24.

Figure 2:
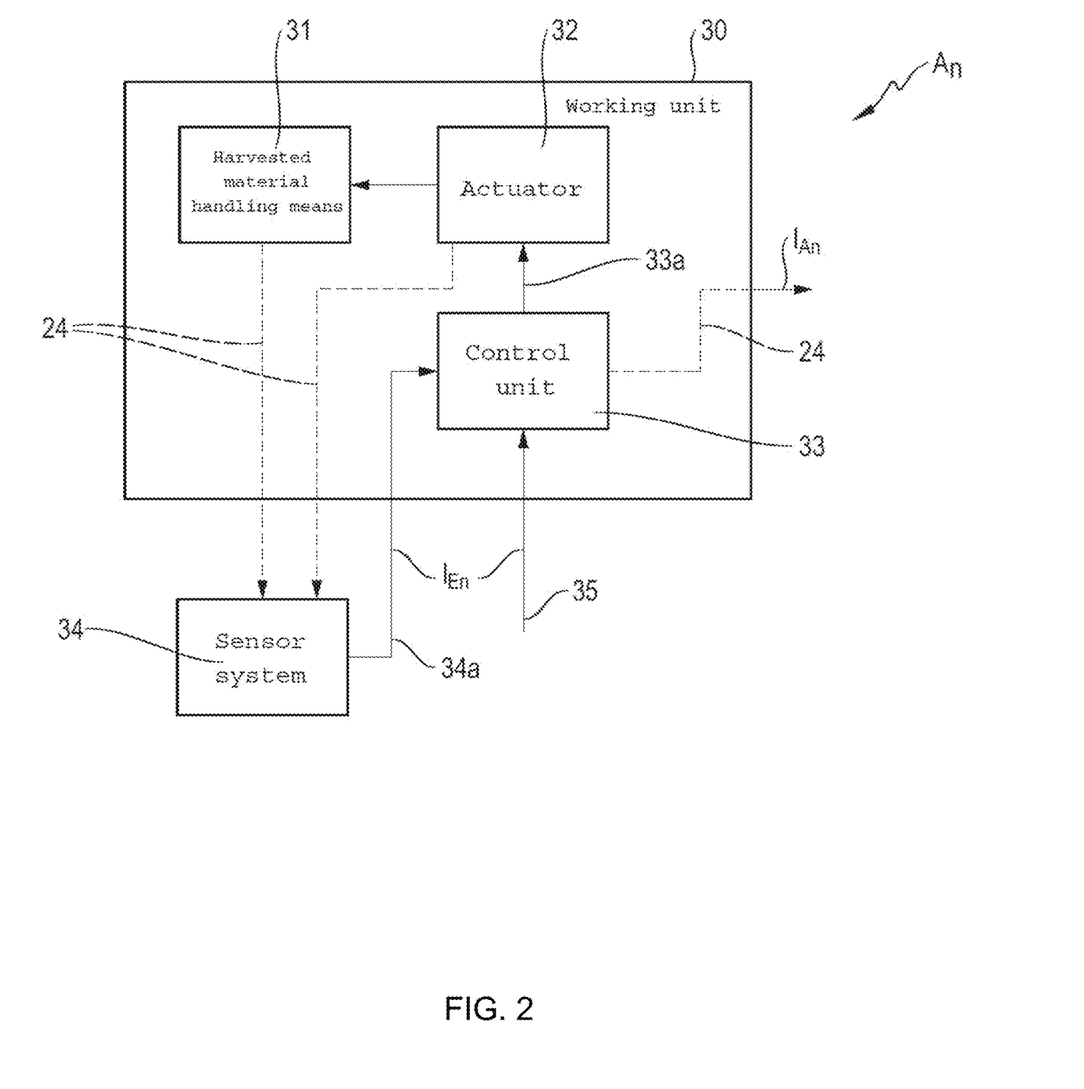
FIG. 2 shows a schematic representation of the structure of an adjusting machine.

FIG. 2 shows a schematic view of the structure of an adjusting machine $A_n$. The working unit 30 designed as an adjusting machine $A_n$ comprises at least one harvested material handling means 31, an actuator 32 and a control unit 33. Control signals 33a are transmitted by the control unit 33 to the actuator 32 using the data bus system 24, with the actuator 32 configured to adjust the at least one harvested material handling means 31. A sensor system 34 monitors the at least one harvested material handling means 31 of the working unit 30 and if necessary the actuator 32. The sensor data 34a generated by the sensor system 34 are transmitted using the bus system 24 to the control unit 33 for evaluation.

Moreover, external information 35 is provided to the control unit 33. The external information may, for example, be transmitted by other harvesting vehicles, work machines and/or a central computer system to the forage harvester 1 and may influence the harvest handling process of the harvester 1. The sensor data 34a provided by the sensor system 34 and the external information 35 form input signals $I_{En}$ of the adjusting machine $A_n$. $I_{An}$ designates input signals from the adjusting machine $A_n$. The adjusting machine $A_n$ autonomously optimizes the mode of operation of the work unit 30, e.g., the adjusting machine $A_n$ is configured to continuously autonomously determine and specify the required adjustments of operating parameters of the work unit 30. Operating parameters that are optimally adapted to the existing operating and harvesting conditions are provided by the adjusting machine $A_n$.

Figure 3:
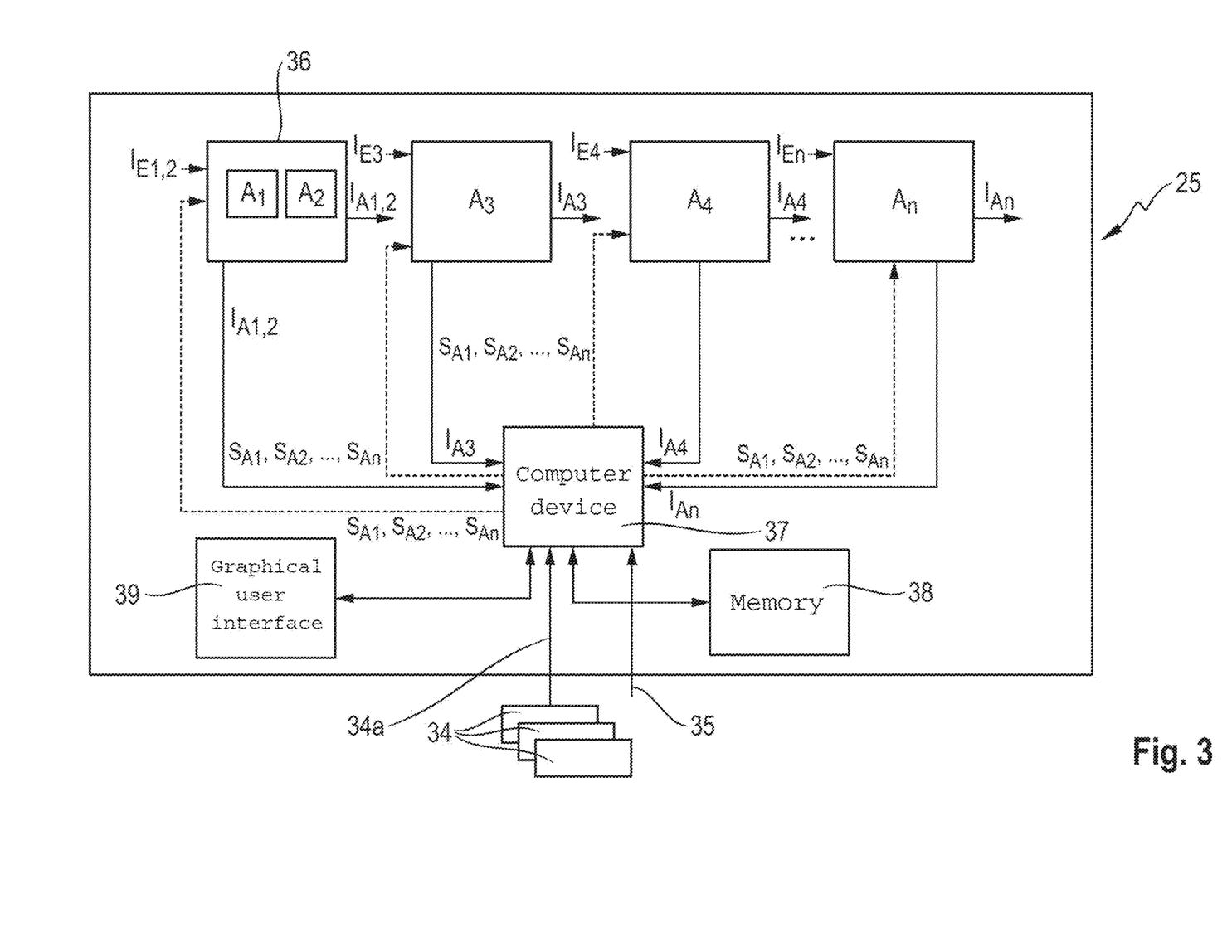
FIG. 3 shows a schematic overview of the structure of a driver assistance system.

FIG. 3 illustrates a schematic overview of the structure of the driver assistance system 25. The driver assistance system 25 comprises a plurality of adjusting machines $A_1$, $A_2$, $A_3$, $A_4$, ..., $A_n$. In principle, each of the adjusting machines $A_1$, $A_2$, $A_3$, $A_4$, ..., $A_n$ operates independently. However, it is contemplated to combine two adjusting machines $A_1$, $A_2$ into one unit as, for example, indicated in FIG. 3. The combination of two adjusting machines $A_1$, $A_2$ is useful when the direct interaction or dependency between these two adjusting machines $A_1$, $A_2$ does not provide any additional added value when there is independent optimization. For example, the adjusting machine $A_1$ designed as an attachment machine that serves to optimize the operating parameters of the attachment 2, and the adjusting machine $A_2$ that is designed as a feed machine that serves to optimize the operating parameters of the feed device 3 are combined in the forage harvester 1 into a common adjusting machine that is termed a feed machine 36.

The driver assistance system 25 comprises a computing device 37, a memory 38 as well as a graphical user interface 39. The computing device 37 is one example of a processor and is configured to process data saved in the memory 38. Moreover, the computing device 37 of the driver assistance system 25 receives and processes the sensor data 34a from the sensor system 34, as well as the provided external information 35.

The driver assistance system 25 has one or more sets of rules that are saved in the memory 38 and/or in a memory unit of the control units 33 of the adjusting machines $A_1$, $A_2$, $A_3$, $A_4$, ..., $A_n$ and are assigned to the respective adjusting machines $A_1$, $A_2$, $A_3$, $A_4$, ..., $A_n$. The set of rules assigned to the respective adjusting machine $A_1$, $A_2$, $A_3$, $A_4$, ..., $A_n$ effectuates an optimization of the mode of operation of the respective working unit 30 independent of the mode of operation of the other working units 30. The sets of rules comprise expert knowledge and adaptable characteristic curves or characteristic maps.

The adjusting machines $A_1, A_2, A_3, A_4, \ldots, A_n$ are integrated in the higher-level driver assistance system 25 in the control hierarchy, wherein the mode of operation of each adjusting machine $A_1, A_2, A_3, A_4, \ldots, A_n$ is optimizable per se by the driver assistance system 25 or depending on at least one additional adjusting machines $A_1, A_2, A_3, A_4, \ldots, A_n$. Accordingly, the higher level driver assistance system 25 provides each adjusting machine $A_1, A_2, A_3, A_4, \ldots, A_n$ with corresponding input signals $I_{E1}, I_{E2}, I_{E3}, I_{E4}, \ldots, I_{En}$ that are processed corresponding to the respective set of rules of the adjusting machines $A_1, A_2, A_3, A_4, \ldots, A_n$. To optimize the mode of operation of the respective adjusting machine $A_1, A_2, A_3, A_4, \ldots, A_n$, an output signal $I_{A1}, I_{A2}, I_{A3}, I_{A4}, \ldots, I_{An}$ is generated that serves to control the respective actuator 32 of the working unit 30 controlled by the adjusting machine $A_1, A_2, A_3, A_4, \ldots, A_n$.

Moreover, the output signals $I_{A1}, I_{A2}, I_{A3}, I_{A4}, \ldots, I_{An}$ are transmitted to the computing device 37 of the driver assistance system 25. The driver assistance system 25 provides the output signals $I_{A1}, I_{A2}, I_{A3}, I_{A4}, \ldots, I_{An}$ as additional control signals $S_{A1}, S_{A2}, S_{A3}, S_{A4}, \ldots, S_{An}$ to the other adjusting machines $A_1, A_2, A_3, A_4, \ldots, A_n$. This provides the driver assistance system 25 and the adjusting machines $A_1, A_2, A_3, A_4, \ldots, A_n$ with additional information which makes it possible to account for interactions arising from modified settings of a working unit 30 with one or more other working units 30 while they are being optimized.

The graphical user interface (GUI) 39 of the driver assistance system 25 enables communication between an operator of the forage harvester 1 and the driver assistance system 25. In one implementation, the term "communication" comprises the visualization of sensor-detected data, operating parameters, harvested material processing parameters, modes of operation strategies available for selection and other information that is used by the operator to operate and for decision-making to control the working units 30 and the forage harvester 1.

In this context, communication can occur interactively between the operator and the driver assistance system 25 in natural language in the form of a dialog. Likewise, the term "communication" may comprise the manual entry of commands, selection confirmations, data, etc. by the operator which is also done in the form of dialog, such as at least in parts. For this, the driver assistance system 25 comprises a dialog module 40 that enables dialog-guided operation of the driver assistance system 25 by the operator. In addition, the driver assistance system 25 can be operated in an automatic mode. The dialog module 40 is either activated by the operator or, in automatic mode, automatically when a critical mode of operation of the forage harvester 1 or at least one working unit 30 exists.

Figure 4:
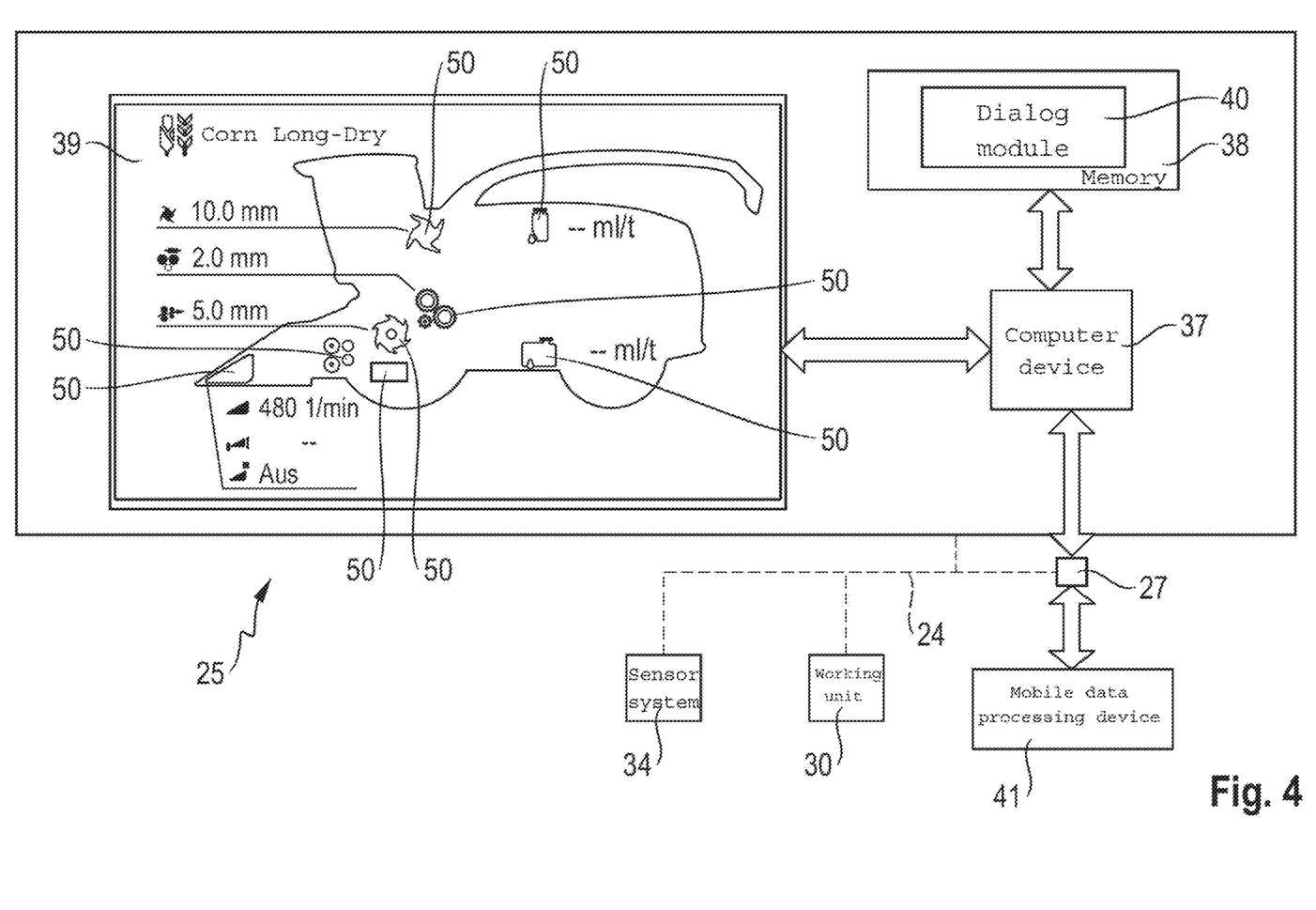
FIG. 4 shows a schematic representation of a graphical user interface of a driver assistance system according to FIG. 3.

FIG. 4 shows a schematic representation of a graphical user interface 39 of the driver assistance system 25 according to FIG. 3. The dialog module 40 saved in the memory 38 is executed by the computing device 37 and allows for natural-language interaction of the operator with the driver assistance system 25. The graphical user interface 39 shows an example of an overview of portrayed information of the forage harvester 1, such as driving speed and rotational speed of the drive device 19, as well as its working units 30. For this, the forage harvester 1 is portrayed in the form of a simplified graphic. Individual working units 30 of the forage harvester 1, about which information regarding set operating parameters is displayed, may be visually highlighted, for example by pictograms 50. The input/output device 23 of the driver assistance system 25 may comprise a touch-sensitive screen, thereby allowing the operator to activate the dialog module 40 by a specific selection of the individual pictograms 50.

For example, the representation in FIG. 4 shows an example of the feed device 3, the chopping device 6, the post-processing device 10 and the post-acceleration device 11 as a pictogram 50 in each case. At least partially corresponding operating parameters for these working units 30 are shown, such as the roller spacing between the first pair of rollers 4a, 4b and the second pair of rollers 5a, 5b of the feed device 3 as well as the rollers of the post-processing device 10. A grinding device for grinding the cutting blades 8 of the chopping device 6 is also shown in pictogram 50.

Moreover, a mobile data processing device 41 is schematically portrayed in FIG. 4 by means of which the communication unit 27 can be connected by signals to the driver assistance system 25. The mobile data processing device 41 may comprise a smartphone, tablet computer, etc. so that use is also possible outside of the forage harvester 1. Generally, the mobile data processing device 41 has a touch-sensitive display element which is therefore also configured to enter data.

The communication unit 27 is equipped with at least one first interface that can be connected to the bus system 24 of the forage harvester 1 so that signals from the working units 30, the sensor system 34 and the adjusting machines $A_1, A_2, A_3, A_4, \ldots, A_n$ that are transported by the bus system 24 can be received. A second interface serves to process and prepare signals from the bus system 24 and to wirelessly transmit them to the mobile data processing device 41. The communication unit 27 is data-linked to the driver assistance system 25 so that data generated by the mobile data processing device 41 is transmittable by the communication unit 27 to the driver assistance system 25, in particular suppliable to the dialog module 40.

Figure 5:
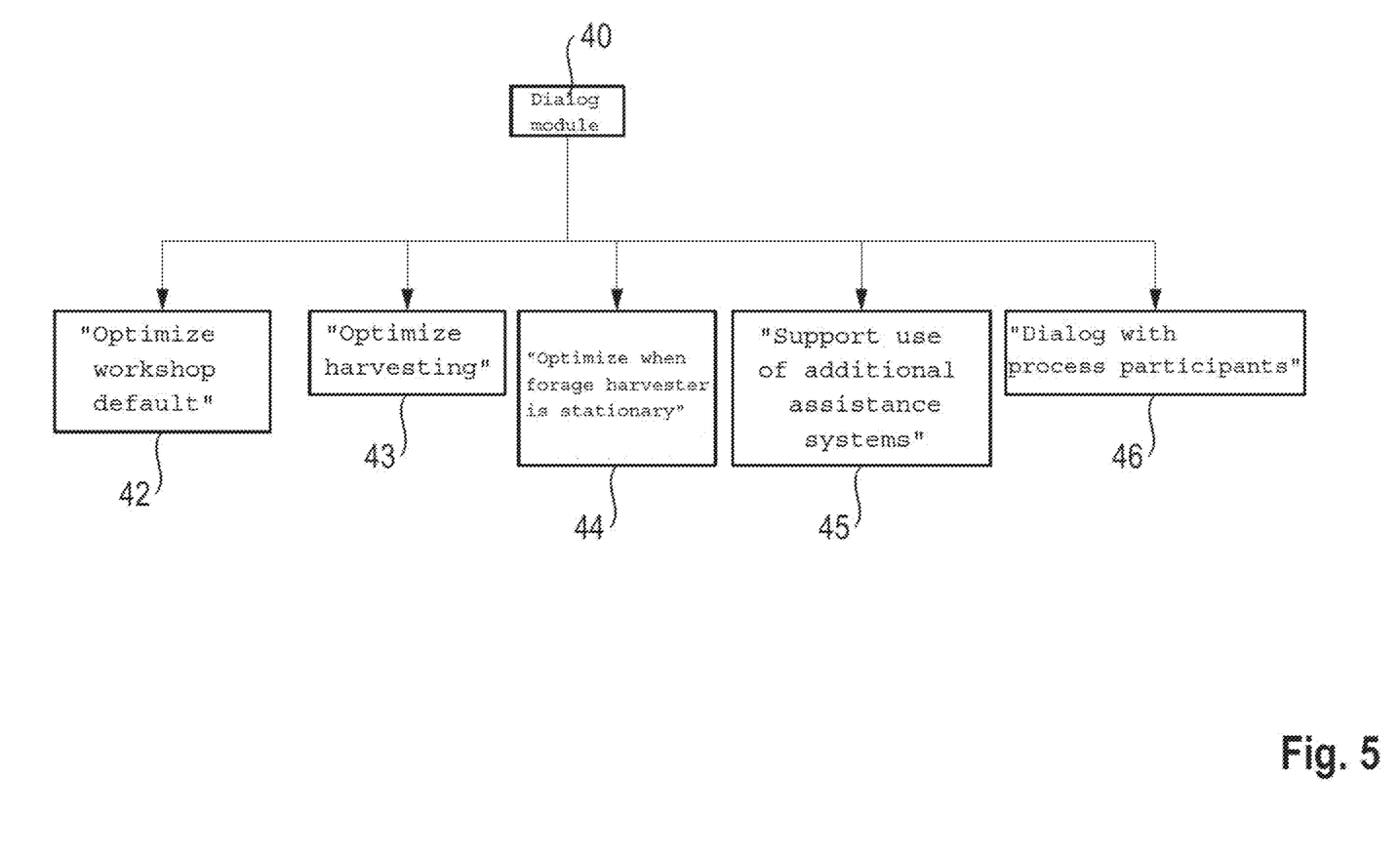
FIG. 5 shows a schematic representation of a dialog module of the driver assistance system.

When it is activated, the dialog module 40 offers various subdialogs that are always available depending on the operating situation of the forage harvester 1, or can be dependent on an existence of a specific operating situation. An overview of possible subdialogs is shown in FIG. 5. "Optimize workshop default" 42, "Optimize harvesting" 43, "Optimize when forage harvester is stationary" 44, "Support use of additional assistance systems" 45 and "Dialog with process participants" 46 subdialogs are provided. These subdialogs are provided by way of example.

Before initiating harvesting mode, the "Optimize workshop default" 42 subdialog gives the operator the option of preparing, converting or servicing the forage harvester 1 guided by dialog. Conversion can, for example, be recommendable when switching from harvesting corn to harvesting grass in which the post-processing device 10 (such as an aftertreatment device) is removed from the flow of material. Moreover, such a switch of harvested material requires another attachment 2 that is already attached to the forage harvester 1 in order to be brought thereby to the site of use.

The "Optimize harvesting" 43 subdialog is the focal point since the optimization of the working units 30 is carried out within this subdialog 43. Moreover, this subdialog 43 offers additional optimization options that may necessitate manual intervention by the operator during the downtime of the forage harvester 1. These additional optimization options can, for example, be the adjustment of scrapers on the feed drum of the attachment designed as a corn head, or the distance from the guide fingers. Since such additional optimization options may only be performed when the forage harvester 1 and its working units 30 are at a stand-still, these additional optimization options may be saved as tasks in the memory 38 and shown on a graphical user interface 39 as tasks to be executed.

In so doing, the mobile data processing device 41 simplifies the execution of this task since the mobile data processing device 41 may be carried along outside of the forage harvester 1 and in so doing may communicate by means of the communication unit 27 with the forage harvester 1 or working units 30 and the driver assistance system 25.

The "Optimize when the forage harvester is stationary" 44 subdialog enables the showing to the operator step-by-step instructions for the additional optimization options to be performed manually that are also explained by information on the use of the additional optimization option and pictures.

In the "Support use of additional assistance systems" 45 subdialog, the operator is provided with support in adjusting additional assistance systems that do not directly serve to optimize the mode of operation of the working units 30. For example, there is a transfer assistance system for the forage harvester 1 that controls the process of transferring the chopped harvested material to a transport truck in order to minimize the loss of harvested material. Another additional assistance system is a driving speed assistance system through which the driving speed may be automatically adjusted when the operator specifies the drive device 19 load depending on the harvested material through-put and load.

The "Dialog with process participant" 46 subdialog makes it possible to extend the range of the driver assistance system 25 beyond the working units 30 of the forage harvester 1 in order to cause the adjustment of working units 30 to be optimized that can be influenced by harvested material processing processes downstream from working results. For example, the compressibility of harvested material in a silo is determined by the chaff length. In this context, harvested material with a greater chaff length can be compressed in lower layers in a silo, whereas the chaff length must decrease as the layer height increases in order to achieve or maintain a comparable compressibility. By means of the "Dialog with process participant" 46 subdialog, it is possible for a driver of a compacting vehicle in a silo, as a process participant, to inform the operator of the forage harvester 1 of this changed requirement within the harvesting process chain. This changed requirement is displayed to the operator of the forage harvester 1 on the graphical user interface 39. Using the driver assistance system 25, the operator of the forage harvester 1 may adapt the chaff length corresponding to the requirement, wherein the settings of the operating parameters of the working units 30 whose interactions have an influence on the chaff length are optimized by the respective adjusting machines $A_1, A_2, A_3, A_4, \ldots, A_n$.

Figure 6:
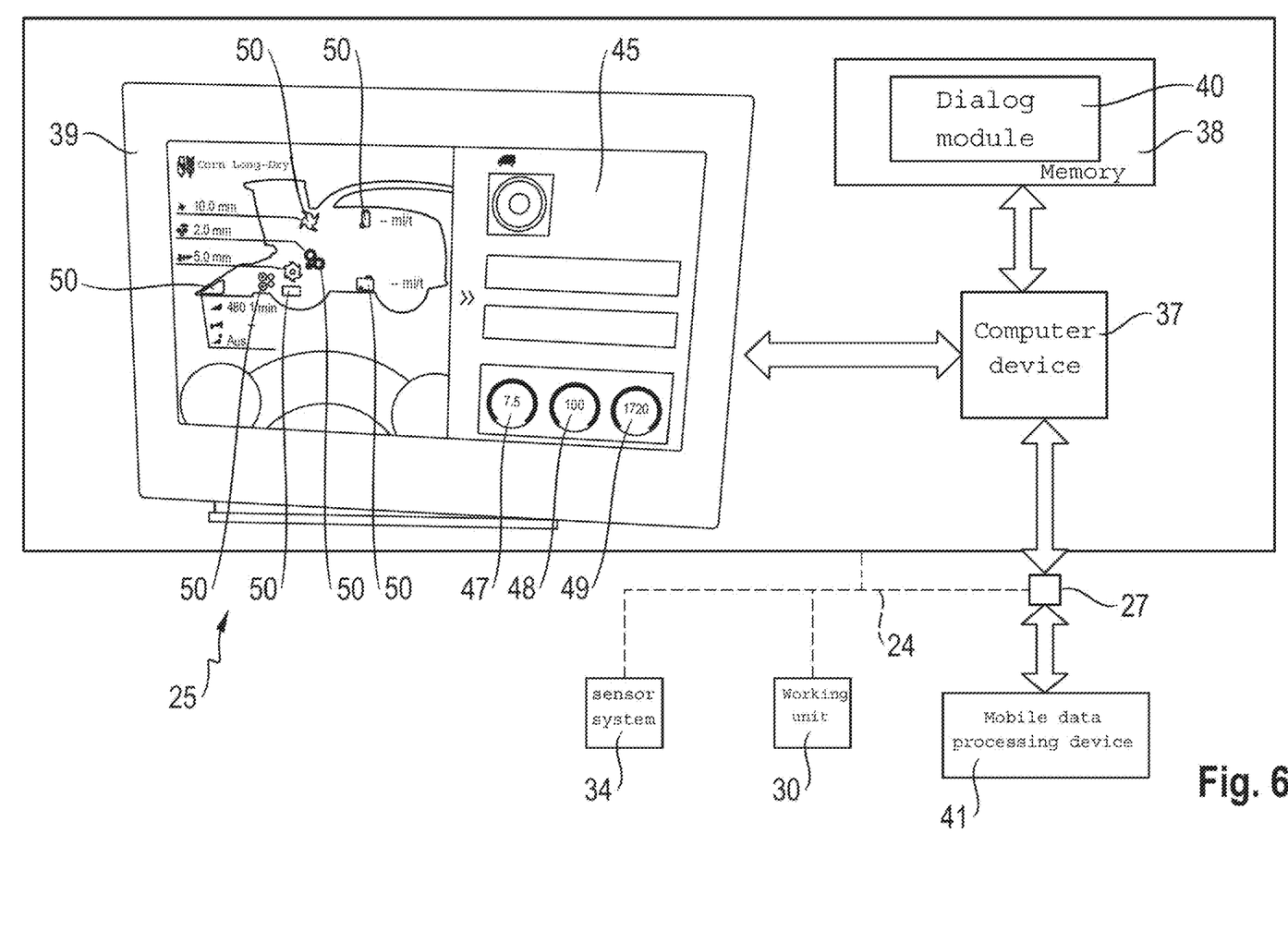
FIG. 6 shows a schematic representation of the graphical user interface of the driver assistance system according to FIG. 4 with a selected subdialog.

FIG. 6 shows a schematic representation of the graphical user interface 39 of the driver assistance system 25 according to FIG. 4 with a selected subdialog, "Support use of additional assistance systems" 45. The driving speed assistance system is shown, through which a driving speed 47 is automatically controlled. The operator can indicate a desired drive device 19 load by correspondingly setting a drive speed 49. The drive device 19 of the forage harvester 1 then may seek to achieve the given load. The driving speed 47 is automatically reduced when there is a sudden increase in inventory. If the inventory decreases, the driving speed assistance system again raises the driving speed 47 of the forage harvester 1 until the given load on the drive device 19 is reached. In this context, the control is based on the recognition of throughput volume 48 and the drive speed 49 (e.g., the load or drive rotational speed).

In addition to the supply machine in which the attachment machine and the feed machine are functionally combined, the adjusting machines $A_1, A_2, A_3, A_4, \ldots, A_n$ integrated in the driver assistance system 25 comprise a chopping machine, a cutting-edge sharpening machine, a post-processing machine, a silage additive machine, an ejection machine as well as an ancillary unit optimization machine.

The chopping machine has the function of optimizing the chaff length depending on a selectable working-unit-specific strategy. The adaptation of the chaff length occurs against the backdrop of a strategic selection of the "performance" or "work quality" that underlie the harvesting process parameters of "compressibility" or "area output". With the strategic selection of "work quality", a desired compressibility of the harvested material is sought that is achievable with a relative dry material content, which can be determined by sensors, and a corresponding chaff length that corresponds thereto. The relationship between compressibility, relative dry material content and chaff length can be saved in at least one characteristic map that forms an essential part of the set of rules of the chopping machine. With the strategic selection of "output", the idea of efficiency is in the foreground when operating the forage harvester 1. For a very large area output, the fuel consumption should be minimized so that the chaff length can be adjusted as needed for compressibility.

The quality of the chopping process as well as the power consumption of the chopping device 6 is influenced by the sharpness of the cutting blades 8 and the position or distance of the shear bar 9 to the envelope circle of the rotating cutting blades 8. At this point, the cutting edge sharpening machine may intervene and independently initiate the regrinding of the cutting blades, or may at least propose to the operator when the quality and/or the power consumption of the chopping device 6 necessitate this. Since the grinding of the cutting blades 8 and a readjustment of the shear bar 9 that may be necessary may lead to an interruption the harvesting process, the driver assistance system 25 that is higher in the control hierarchy may coordinate the time for performing the grinding process and the resetting of the shear bars.

Both the chaff length as well as the quality of the chopping process may be monitored by a sensor in optical sensor system 34, whose data may be transmitted to any one, any combination, or all of the feed machine, the chopping machine and the cutting edge sharpening machine.

During the harvesting of corn, the post-processing device 10 may be used that serves to crack the corn grains. The post-processing device 10 is controlled or regulated by the aftertreatment machine. In so doing, the quality of corn cracking is detected as a harvesting process parameter by the sensor system 34 that also serves to monitor and determine the chaff length. The aftertreatment machine controls or regulates the spacing of the rollers of the post-processing device 10. Moreover, it can be provided for the aftertreatment machine to also adjust the differential rotational speed. The post-processing device 10 is also controllable using selectable work-unit-specific strategies. In so doing, the strategies of "work quality" and "performance" in particular contrast with each other. Increasing grain cracking may necessitate a smaller spacing of the rollers relative to each other such that the power consumption of the post-processing device 10 rises significantly for a given throughput of the harvested material. The after-treatment machine makes it possible to determine settings by means of data on grain cracking quality provided by the sensor system 34 at which sufficient grain cracking can be achieved with the lowest possible power consumption.

In preparation for storing the chopped harvested material in a silo, the harvested material in the forage harvester 1 is supplied with a silage additive in order to, inter alia, enhance the fermentation process and improve the storage life of the harvested material. The silage additive, or a mixture consisting of a silage additive and water, is applied via a silage additive metering device 14 to the harvested material flowing by. The sensor 17 is configured to sensorally detect contents of the chopped harvested material. Based on the evaluation, the silage additive metering device 14 is controlled by the silage additive machine in order to achieve an optimization in the context of a selected strategy of "work quality" in the sense of effective ensilability or "cost", e.g., the lowest possible amount of silage additive used.

The ejection machine controls or regulates the mode of operation of the post-acceleration device 11 and the ejection device 13 taking into consideration the opposing strategies of "efficiency" and "performance". Using another sensor system 34 that can be assigned to the ejection device, the flow speed and the flow behavior or the flow of harvested material may be determined and monitored. The specific adjustments for the ejection machine that require a good flow of material on the one hand and lowest possible power consumption of the post-acceleration device 11 on the other hand can be determined by the set of rules.

The ancillary unit optimization machine is assigned the task of realizing further optimizations with respect to "work quality", "performance" and "efficiency" in addition to the central adjusting machines $A_1, A_2, A_3, A_4, \ldots, A_n$ of the respective working units 30. The set of rules of the ancillary unit optimization machine may be based on the same prerequisites as the others set of rules for the adjusting machines $A_1, A_2, A_3, A_4, \ldots, A_n$. For example, the auxiliary unit optimization machine may be supplied by the sensor system 34 with corresponding through-put-specific sensor data 34a that determine the throughput of harvested material in order to perform a throughput-dependent setting of the drum floor of the chopping device 6, which may reduce the power consumption of the chopping device 6. It is also contemplated to reset the distance of a shaft wall of the delivery shaft 12 to the post-acceleration device 11 when harvesting grass in order to achieve a faster discharge speed.

Each of the items listed above may be associated with a single electronic device or may be combined within a single electronic device. Further, with regard to each separate electronic device, processing/memory functionality may be included.

The methods, devices, processing, circuitry, and logic described above may be implemented in many different ways and in many different combinations of hardware and software. As discussed above, computing device 37 is configured to process data saved in the memory 38. Computing device may comprise a microprocessor. Though computing device 37 and memory 38 are depicted as separate elements, they may be part of a single machine, which includes a microprocessor (or other type of controller) and a memory unit. The microprocessor and memory unit are merely one example of a computational configuration. Other types of computational configurations are contemplated. For example, all or parts of the implementations may be circuitry that includes a type of controller, including as an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions, which may comprise computer-readable instructions, may implement the functionality described herein and may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

| List of reference numbers | |
|---|---|
| 1 | Forage harvester |
| 2 | Attachment |
| 3 | Feed device |
| 4a | Roller |
| 4b | Roller |
| 5a | Roller |
| 5b | Roller |
| 6 | Chopping device |

List of reference numbers

| | |
|---|---|
| 7 | Cutterhead |
| 8 | Cutting blade |
| 9 | Shear bar |
| 10 | Post-processing device |
| 11 | Post-acceleration device |
| 12 | Delivery shaft |
| 13 | Ejection device |
| 14 | Silage additive metering device |
| 15 | Delivery pump |
| 16 | Injector |
| 17 | Sensor |
| 18 | Sensor |
| 19 | Drive device |
| 20 | Belt drive |
| 21 | Drive |
| 22 | Cabin |
| 23 | Input/output device |
| 24 | Bus system |
| 25 | Driver assistance system |
| 26 | Sensor |
| 27 | Communication unit |
| 30 | Working unit |
| 31 | Harvested material handling means |
| 32 | Actuator |
| 33 | Control unit |
| 33a | Control signal |
| 34 | Sensor system |
| 34a | Sensor data |
| 35 | External information |
| 36 | Feed machine |
| 37 | Computer device |
| 38 | Memory |
| 39 | Graphical user interface |
| 40 | Dialog module |
| 41 | Mobile data processing device |
| 42 | Subdialog |
| 43 | Subdialog |
| 44 | Subdialog |
| 45 | Subdialog |
| 46 | Subdialog |
| 47 | Driving speed |
| 48 | Throughput volume |
| 49 | Drive rotational speed |
| 50 | Pictogram |
| $A_1$ | Adjusting machine |
| $A_2$ | Adjusting machine |
| $A_3$ | Adjusting machine |
| $A_4$ | Adjusting machine |
| $A_n$ | Adjusting machine |
| $I_{E1}$ | Input signal |
| $I_{E2}$ | Input signal |
| $I_{E3}$ | Input signal |
| $I_{E4}$ | Input signal |
| $I_{En}$ | Input signal |
| $I_{A1}$ | Output signal |
| $I_{A2}$ | Output signal |
| $I_{A3}$ | Output signal |
| $I_{A4}$ | Output signal |
| $I_{An}$ | Output signal |
| $S_{A1}$ | Input control signal |
| $S_{A2}$ | Input control signal |
| $S_{A3}$ | Input control signal |
| $S_{A4}$ | Input control signal |
| $S_{An}$ | Input control signal |

The invention claimed is:

1. A forage harvester comprising:
a plurality of working units for performing a harvested material processing process, wherein the plurality of working units have at least one adjustable harvested material handling means, at least one actuator for adjusting or actuating the at least one harvested material handling means and a control unit for controlling the actuator, wherein a respective working unit is configured as a respective adjusting machine;
a graphical user interface (GUI); and
a driver assistance system comprising a memory for saving data and a processor for processing data saved in the memory and the GUI, the driver assistance system configured to generate an input signal for input to the control unit of the respective working unit for each of the plurality of working units,
wherein functioning of the one or more adjusting machines is optimized by the driver assistance system or depending on at least one additional adjusting machine;
wherein the plurality of adjusting machines, using rules associated with respective ones of the plurality of adjusting machines and the input signals, are configured to generate output signals that control the respective actuators;
wherein the driver assistance system and at least one adjusting machine are configured to receive the output signal of one or more other adjusting machines so that the control unit of the at least one adjusting machine is configured to receive as input the output signal of the one or more adjusting machines and the input signal generated by the driver assistance system; and
wherein the driver assistance system and the at least one adjustment machine are configured to use the received output signals as input signals in order to consider interactions arising from modified settings of at least one working unit with another working unit associated with the at least one adjusting machine.

2. The forage harvester of claim 1, wherein the driver assistance system includes sets of rules saved in the memory or in a memory unit of the respective control units that are assigned to the respective adjusting machines; and
wherein the set of rules assigned to the respective adjusting machine produce an optimization of a mode of operation of the respective working unit independent of the mode of operation of other working units.

3. The forage harvester of claim 2, wherein the driver assistance system includes selectable, working-unit-specific strategies saved in the memory for optimizing the mode of operation of individual working units.

4. The forage harvester of claim 3, wherein the selectable strategies are each directed toward a target for adjusting or optimizing at least one harvesting process parameter by specifying at least one operating parameter of at least one of the working units.

5. The forage harvester of claim 1, wherein the driver assistance system is configured to be activated by detection of critical forage harvester mode of operation.

6. The forage harvester of claim 1, wherein the driver assistance system is configured to optimize an overall work process by:
(a) analyzing a mode of operation of the forage harvester and identifying a critical mode of operation;
(b) processing at least one set of rules to overcome the critical mode of operation by proposing optimized operating parameters of the plurality of working units taking into account interactions between the working units;
(c) generating an output to visualize an effect of the interactions;
(d) adjusting, independently without operator input, the operating parameters generated in (b) of one of the plurality of working units, and operate the forage harvester with the optimized operating parameters; and (e) evaluating and reviewing the mode of operation of the forage harvester after adjusting the optimized operating parameters for the at least one working unit.

7. The forage harvester of claim 1, wherein at least some of the working units are assigned a sensor system that is configured to detect signals to determine operating parameters and working-unit-specific harvesting process parameters; and wherein the driver assistance system is configured to receive and evaluate the signals of the respective sensor system.

8. The forage harvester of claim 1, wherein the driver assistance system comprises a dialog module configured for dialog-guided operation of the driver assistance system by an operator.

9. The forage harvester of claim 8, wherein a dialog between the driver assistance system and the operator comprises at least the following steps:
   a) activate the dialog module;
   b) edit an intended purpose;
   c) start an optimization module that requires the operator to select a strategy; and
   d) activate a dialog-guided optimization of at least one operating parameter of a working unit depending on the selected strategy taking into account an influence by working-unit-specific parameters of other working units.

10. The forage harvester of claim 1, wherein the driver assistance system is connectable to a mobile data processing device for performing bidirectional communication; and wherein the mobile data processing device has a graphical user interface and is configured to execute at least some functions of the driver assistance system of the forage harvester for visualization at the mobile data processing device and for remote control of the forage harvester.

11. The forage harvester of claim 10, further comprising:
a bus system; and
at least one first interface connected to the bus system and at least one second interface for processing and preparing signals from the bus system, and for transmitting to the mobile data processing device.

12. The forage harvester of claim 11, wherein the mobile data processing device includes a memory unit in which retrievable audiovisual sequences are saved.

13. The forage harvester of claim 12, wherein the mobile data processing device is configured to be operated independently of an operating state of the forage harvester.

14. The forage harvester of claim 1, wherein the plurality of adjusting machines transmit their respective output signals to the driver assistance system; and wherein the driver assistance system is configured to then route the respective output signals as the input signals to others of the plurality of adjusting machines.

15. The forage harvester of claim 14, wherein the driver assistance system comprises a central computing device through which to receive the respective output signals; and wherein the central computing device is configured to route the respective output signals as the input signals to the others of the plurality of adjusting machines.

16. The forage harvester of claim 1, wherein the driver assistance system is configured to optimize an overall work process by:
   (a) analyzing a mode of operation of the forage harvester and identifying a critical mode of operation;
   (b) processing at least one set of rules to overcome the critical mode of operation by proposing optimized operating parameters of the plurality of working units taking into account interactions between the working units;
   (c) generating an output to visualize an effect of the interactions;
   (d) adjusting, by operator input, the operating parameters generated in (b) of one of the plurality of working units, and operate the forage harvester with the optimized operating parameters; and
   (e) evaluating and reviewing the mode of operation of the forage harvester after adjusting the optimized operating parameters for the at least one working unit.

17. A method for operating a forage harvester comprising:
performing a harvested material processing process using a plurality of working units, wherein the plurality of working units have at least one adjustable harvested material handling means, at least one actuator for adjusting or actuating the at least one harvested material handling means and a control unit for controlling the actuator, wherein a respective working unit is configured as a respective adjusting machine;
sensing operations of the control units;
controlling operation of the one or more adjusting machines by:
   using a driver assistance system, the driver assistance system comprising a memory for saving data and a processor for processing data saved in the memory and a graphical user interface;
generating, by the driver assistance system, an input signal for input to the control unit of the respective working unit for each of the plurality of working units;
using, by the plurality of adjusting machines, rules associated with respective ones of the plurality of adjusting machines and the input signals, to generate output signals that control the respective actuators;
receiving, by the driver assistance system and at least one adjusting machine, the output signal of one or more other adjusting machines so that the control unit of the at least one adjusting machine receives as input the output signal of the one or more adjusting machines and the input signal generated by the driver assistance system; and
using, by the driver assistance system and the at least one adjustment machine, the received output signals as input signals in order to consider interactions arising from modified settings of at least one working unit with another working unit associated with the at least one adjusting machine.

18. The method of claim 17, wherein using the driver assistance system to optimize an overall work process includes:
   (a) analyzing a mode of operation of the forage harvester and identifying a critical mode of operation;
   (b) processing at least one set of rules to overcome the critical mode of operation by proposing optimized operating parameters of the plurality of working units taking into account interactions between the working units;
   (c) generating an output to visualize an effect of the interactions;
   (d) adjusting, independently or by an operator, the operating parameters generated in (b) of one of the plurality of working units, and operate the forage harvester with the optimized operating parameters; and
   (e) evaluating and reviewing the mode of operation of the forage harvester after adjusting the optimized operating parameters for the at least one working unit.

19. The method of claim 17, wherein the plurality of adjusting machines transmit their respective output signals to the driver assistance system; and wherein the driver assistance system routes the respective output signals as the input signals to others of the plurality of adjusting machines.

20. The method of claim 19, wherein the driver assistance system comprises a central computing device through which to receive the respective output signals; and wherein the central computing device routes the respective output signals as the input signals to the others of the plurality of adjusting machines.

\* \* \* \* \*